United States Patent [19]

Mitomi

[11] Patent Number: 4,708,306
[45] Date of Patent: Nov. 24, 1987

[54] DEVICE FOR FASTENING BAND-LIKE MEMBER PASSED THERETHROUGH
[75] Inventor: Seiji Mitomi, Yokohama, Japan
[73] Assignee: Nifco, Inc., Yokohama, Japan
[21] Appl. No.: 907,567
[22] Filed: Sep. 15, 1986
[30] Foreign Application Priority Data Sep. 19, 1985 [JP] Japan .................................. 60-143335

[51] Int. Cl.⁴ ............................................... F16L 3/03
[52] U.S. Cl. ................................. 248/74.3; 24/16 PB; 248/71
[58] Field of Search ................... 248/74.3, 74.1, 74.2, 248/74.4, 73, 71; 24/16 PB, 17 A

[56] References Cited

U.S. PATENT DOCUMENTS

| | | | |
|---|---|---|---|
| 2,491,290 | 12/1949 | Tinnerman | 248/74.3 X |
| 2,632,217 | 3/1953 | Flora | 248/74.3 X |
| 3,463,427 | 8/1969 | Fisher | 248/71 X |
| 3,552,696 | 1/1971 | Orenick et al. | 248/71 X |
| 3,581,347 | 6/1971 | Verspieren | 24/16 PB |
| 4,128,220 | 12/1978 | McNeel | 248/74.3 X |
| 4,236,280 | 12/1980 | Kreiseder | 24/16 PB |
| 4,272,047 | 6/1981 | Botka | 248/74.3 |
| 4,455,715 | 6/1984 | Matsui | 248/74.3 X |
| 4,473,524 | 9/1984 | Paradis | 24/16 PB X |
| 4,561,153 | 12/1985 | Matsui | 248/74.4 X |

Primary Examiner—Ramon O. Ramirez
Attorney, Agent, or Firm—Trexler, Bushnell, Giangiorgi & Blackstone, Ltd.

[57] ABSTRACT

A device for fastening a band-like member passed therethrough comprises a hollow cylindrical body having a band insertion hole for inserting a band therethrough, a lock piece projecting from the hollow cylindrical body and having a lock pawl to be engaged in a groove of the band-like member inserted through the band insertion hole to prevent retraction of the band-like member, and an operating member for releasing the engagement between the lock pawl and lock groove of the band-like member by depressing the lock piece.

7 Claims, 15 Drawing Figures

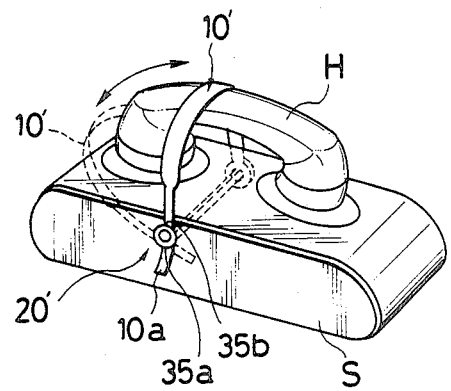
FIG. 7
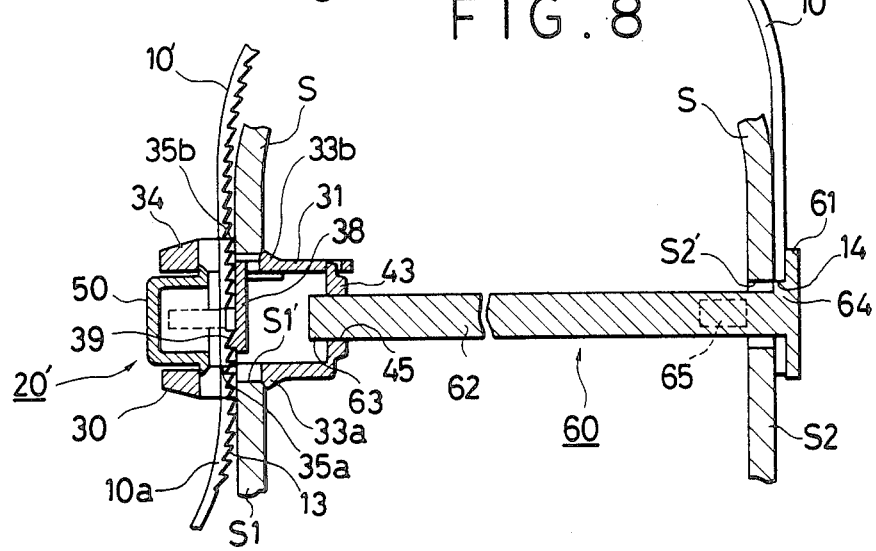
FIG. 8
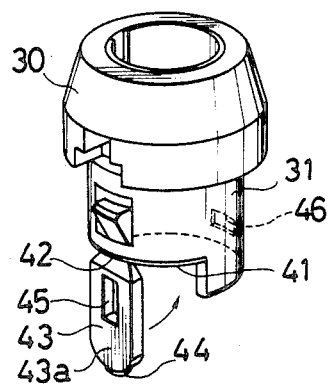
FIG. 9
FIG. 10

DEVICE FOR FASTENING BAND-LIKE MEMBER PASSED THERETHROUGH

FIELD OF THE INVENTION AND RELATED ART STATEMENT

This invention relates to a device for releasably fastening a band or the like passed therethrough.

U.S. Pat. Nos. 4,236,280 and 4,455,715 disclose band fasteners. FIG. 1 shows a band 1 for binding a group of wires or the like. One end of the band 1 is provided with a band fastener 2 having a band insertion hole 2a. The top wall defining the band insertion hole 2a is provided with a lock member 3, which is downwardly inclined from the band insertion end and has a free end portion 3a projecting from the other end of the band insertion hole 2a. The lower surface of the lock member 3 is provided with a transversal lock pawl 4, the height of which progressively increases toward the free end portion 3a. One surface of the band 1 is provided with a plurality of ratchet grooves 1a.

As shown in FIG. 1, to bind a group of wires W the band 1 is looped round the wires W, and then its free end portion 1b inserted through the band insertion hole 2a of the band fastener 2 and pulled. At this time, the band 1 proceeds while causing upward elastic deformation of the lock member 3. Eventually, however, the lock pawl 4 is engaged in a ratchet groove 1a. Now, the band 1 is locked against return so that the wires W are held bound. Reference numeral 5 designates an anchor section which is to be pressure fitted in a mounting hole 6a of a mounting plate 6 or the like to fix the band fastener 2 in place.

With such prior art band fastener 2, to release the lock of the lock pawl 4 from the ratchet groove 1a so as to return the band 1 it is necessary to insert a finger nail into the gap between the end portion 3a of the lock member 3 and the band 1 as shown by dashed lines in FIG. 1 and then to raise the lock member. This operation, however, is rather awkward if the finger nail 7 is short because the end portion 3a of the lock member projects only slightly from the band insertion hole 2a and is strongly urged by the elasticity of the band 1. In addition, two operations of inserting the finger nail and then raising the lock member are necessary, which is very cumbersome.

OBJECT AND SUMMARY OF THE INVENTION

An object of the invention is to provide a fastening device, which can overcome the above drawbacks and permits release of a band by a single operation.

According to the invention, there is provided a device for fastening a band-like member passed therethrough, which comprises a hollow cylindrical body having a band insertion hole for inserting a band therethrough, a lock piece projecting from the hollow cylindrical body and having a lock pawl to be engaged in a groove of the band-like member inserted through the band insertion hole to prevent retraction of the band-like member, and an operating member for releasing the engagement between the lock pawl and lock groove of the band-like member by depressing the lock piece.

When the free end portion of the band-like member is passed through the band insertion holes of the body after looping the band-like member around a group of wires or the like, the lock piece is held pushed down as the band-like member proceeds. The lock pawl of the lock piece is engaged in a ratchet groove of the band at a desired position, whereby the retraction of the band-like member is prevented so that the wires are held bound. To loosen or remove the band-like member, the engagement between the lock pawl and lock groove is released by pushing down the operating member so that the band-like member can be moved in the return direction.

The above and other objects and features of the invention will become more apparent from the detailed description of the invention with reference to the accompanying drawings.

BRIEF DESCRIPTION OF THE DRAWINGS

FIG. 7 is a perspective view showing a second embodiment of the device according to the invention in use;

FIG. 8 is a fragmentary enlarged-scale sectional view showing the device of FIG. 7;

FIG. 9 is a perspective view showing the body of the device of FIG. 7;

FIG. 10 is a perspective view showing a band and a band clip;

DETAILED DESCRIPTION OF THE PREFERRED EMBODIMENTS

Figure 1:
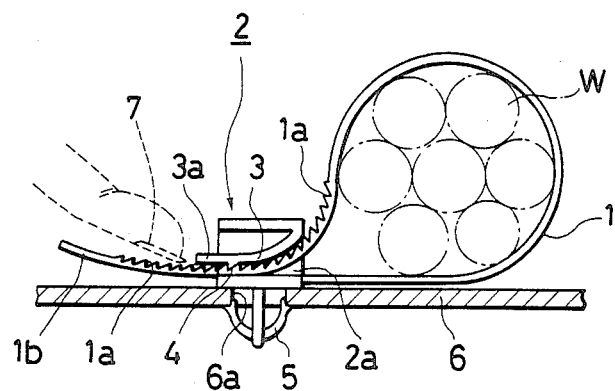
FIG. 1 is a sectional view showing a prior art device for fastening a band-like member passed therethrough in use.

FIGS. 2 to 6 illustrate a first embodiment of the device for fastening a band-like member passed therethrough. Reference numeral 10 designates a band, which is locked by the fastening device according to the invention. The band 10 has a disk-like coupling section 11 provided at one end and having a coupling hole 12 for coupling with a device 20 for fastening. The band 10 has a stem section 10a having a large width and an insertion section 10b having a small width. The insertion section 10b is formed on all of one side, except at opposite edge portions, with a plurality of transversal ratchet grooves 13. Each ratchet groove 13 is inclined such that it becomes deeper toward the free end of the band.

The device 20 for fastening comprises a fastening body 30, through which the band 10 is inserted, and an operating member 50 for releasing the lock of the band 10.

The body 30, as shown in FIGS. 2 to 5, is substantially cylindrical. Its lower half has a smaller outer diameter than the upper half. The small outer diameter lower half 31 has diametrically opposed rectangular holes 32a and 32b. Lock portions 33a and 33b which are outwardly inclined toward their top are provided immediately under a central portion of the lower edge of the respective rectangular holes 32a and 32b.

The large outer diameter upper half 34 of the body 30 has diametrically opposed band insertion holes 35a and 35b which have slightly greater dimensions than the insertion section 10b of the band 10 so that the insertion section 10b can be inserted through these holes.

Notches 36a and 36b are formed adjacent to a central portion of the upper edge of the band insertion holes 35a and 35b for locking stoppers 51a and 51b of the operating member 50 to be described below.

Figure 2:
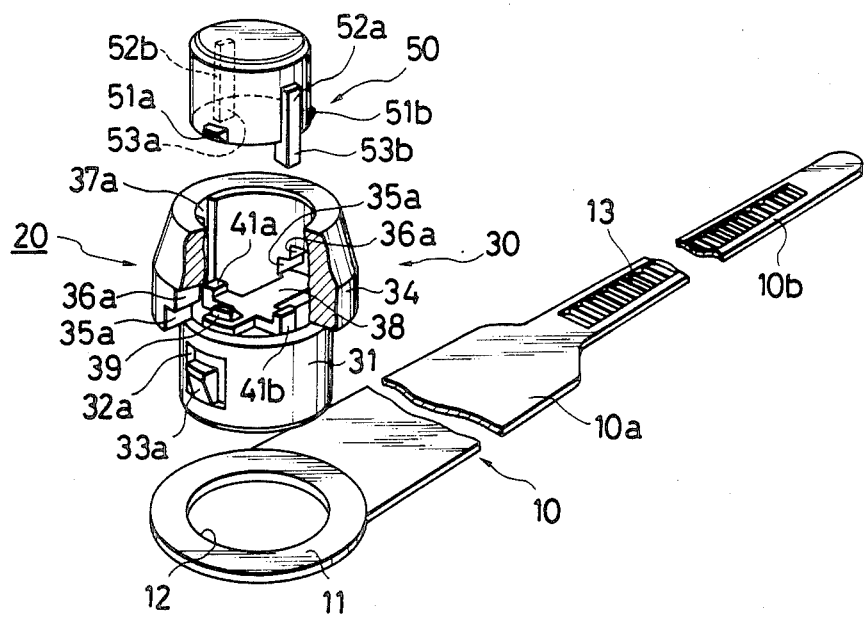
FIG. 2 is an exploded perspective view showing a first embodiment of the device for fastening a band-like member passed therethrough according to the invention.
Figure 3:
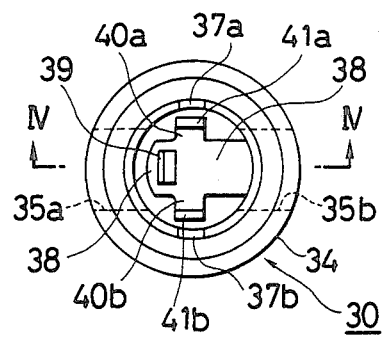
FIG. 3 is a plan view showing a body of the device shown in FIG. 2.
Figure 4:
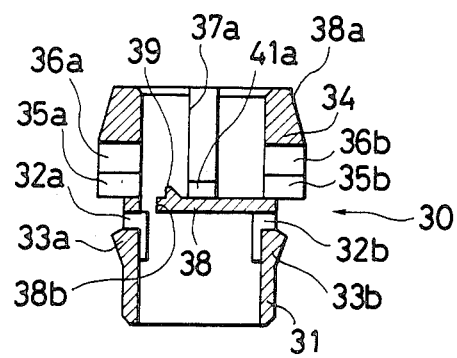
FIG. 4 is a sectional view taken along line IV—IV in FIG. 3.

As shown in FIGS. 2 through 4, the inner wall of the large diameter upper half 34 is formed with diametrically opposed axial guide grooves 37a and 37b extending on the opposite sides of a diametrical line perpendicular to the band insertion holes 35a and 35b.

A substantially cross-shaped lock piece 38 projects horizontally from the top of the inner wall of the small diameter lower half 31. The lock piece 38 projects from a central portion of the lower edge of the band insertion hole 35b toward the other band insertion hole 35a such that its top surface 38a is in the plane of the lower edge of the band insertion holes 35a and 35b.

A free end portion 38b of the lock piece 38 is provided on the upper surface with a lock pawl 39, the height of which increases toward the free end of the lock piece 38.

The lock piece 38 has arms 40a and 40b extending from its intermediate portion toward the guide grooves 37a and 37b in the inner wall of the body 30. The free ends of the arms 40a and 40b are provided with upward projections 41a and 41b.

Figure 6A:
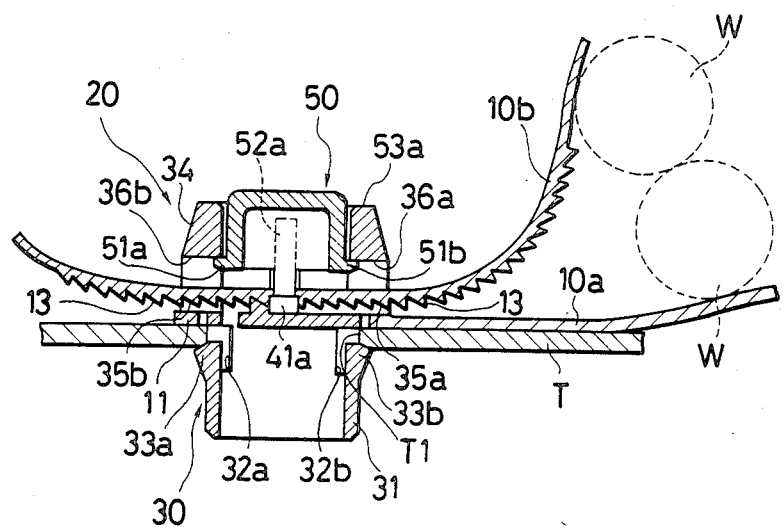
FIG. 6(a) is a sectional view showing a lock piece of the device of FIG. 2 and a band in engagement with one another.

The operating member 50, as shown in FIGS. 2 and 6, is a cylindrical member with a top wall and open at the lower end. Adjacent to its lower end, the operating member 50 has diametrically opposed, outwardly projecting stoppers 51a and 51b which can engage with the upper edge of the notches 36a and 36b of the body 30. The outer periphery of the operating member 50 is provided with diametrically opposed axial guide ribs 52a and 52b which can be engaged in the guide grooves 37a and 37b of the body 30. The guide ribs 52a and 52b have lower extensions 53a and 53b projecting downwardly from the lower end of the cylindrical body for contacting the upward projections 41a and 41b at the free end of the arms 40a and 40b of the lock piece 38. The operating member 50 is axially slidably mounted in the body 30 with the guide ribs 52a and 52b engaged in the guide grooves 37a and 37b. As shown in FIG. 6(a), the extensions 53a and 53b have a lengthwise dimension such that the stoppers 51a and 51b engage with the upper edge of the notches 36a and 36b with the lock piece 38 in the horizontal state and the upward projections 41a and 41b in engagement with the extensions 53a and 53b.

The band 10, body 30 and operating member 50 are all plastic moldings.

The operation of the fastening device will now be described.

Figure 5:
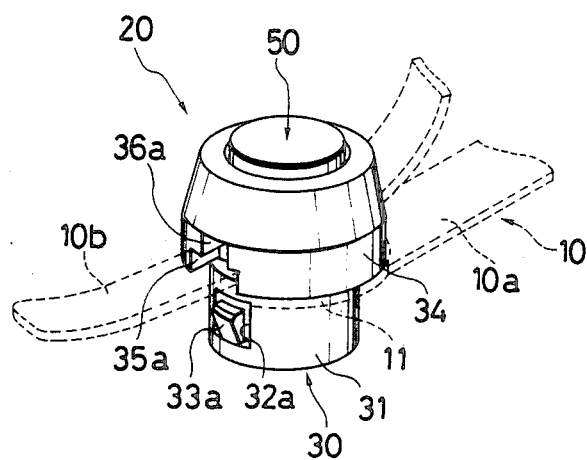
FIG. 5 is a perspective view showing the device of FIG. 2 in use.

As shown in FIGS. 5 and 6, the band 10 is inserted through the band insertion hole 35b and then band insertion hole 35a of the body 30 of the fastening device 20. Since the lower surface of the band 10 coincides with the upper surface 38a of the lock piece 38, the lock piece 38 is downwardly deformed by the band 10 proceeding in contact with the lock pawl 39 at the free end of the lock piece 38. When the progress of the band 10 is stopped, the lock pawl 39 is engaged in a corresponding ratchet groove 13 of the band 10, as shown in FIG. 6(a). The band 10 is thus locked against return.

The band 10 is then looped around wires W, and then the coupling hole 12 of the coupling section 11 is fitted on the small diameter lower half 31 of the body 30. Therefore, the small diameter lower half 31 of the body 30 is forcibly inserted through a mounting hole T1 of a mounting plate T. At this time, the lock portions 33a and 33b of the small diameter lower portion 31 are compressed and elastically deformed by the edge of the hole T1 and restore to their initial state when they clear the hole T1. The body 30 thus is click locked in the mounting hole T1. In the above way, the wires W are tightly bound by the band 10 and coupled to the mounting plate T by the fastening device 20.

Figure 6B:
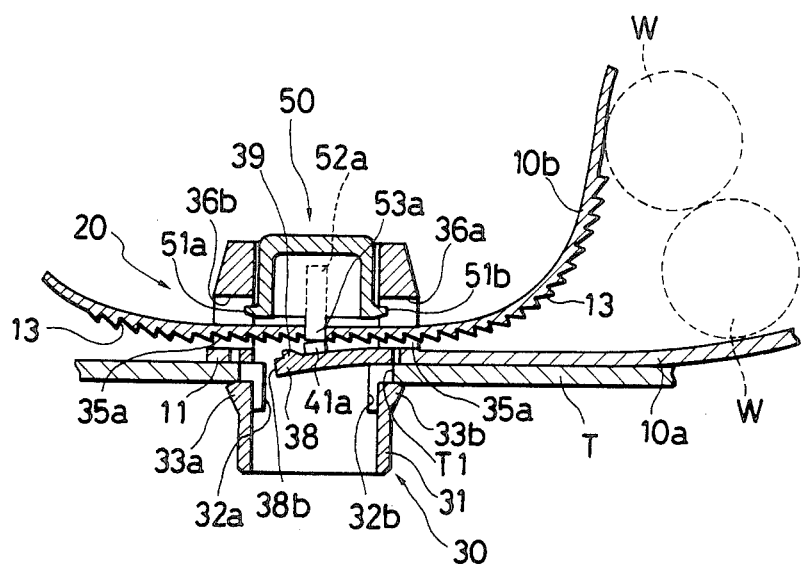
FIG. 6(b) is a sectional view showing the lock piece and band released from the locked state.

To loosen the band 10 or withdraw it from the body 30, the operating member 50 is pushed down. As a result, the operating member 50 is axially lowered with the guide ribs 52a and 52b guided along the guide grooves 37a and 37b, so that the upward projections 41a and 41b at the free end of the arms 40a and 40b are urged by the extensions 53a and 53b to result in downward flexing of the free end portion 38b of the lock piece 38, as shown in FIG. 6(b). Thus, the lock pawl 39 is detached from the ratchet groove 13 of the band 10, that is, the band 10 is released from the locked state. In this way, the band 10 can be moved in the return direction relative to the device 20 by pushing down the operating member 50 with the finger.

FIGS. 7 to 10 illustrate a second embodiment of the invention applied to a device for securing a handset H of a telephone to an acoustic coupler S.

As shown in FIG. 9, this embodiment of the device 20' for fastening has a 180-degree notch 41 formed at the lower end of the small diameter lower half 31 of the body 30. A depending plate member 43 is coupled to the edge of the notch 41 via a thin hinge portion 42, as shown in FIG. 9. The plate member 43 has a semi-circular free end 43a provided with a locking projection 44, and also has a slot 45a. The small diameter lower half 31 of the body 30 has an engagement hole 46 formed at a position opposing the notch 41 such that the locking projection 44 of the plate member 43 can be received in the hole 46. The locking projection 44 is received in the engagement hole 46 by turning the plate member 43 about the hinge portion 42 in the direction of the arrow shown in FIG. 9.

As shown in FIG. 10, the coupling hole 12 of the coupling section 11 of the band 10' is provided with a notch 14. A band clip 60 is coupled to the coupling section 11. As shown in FIG. 10, the band clip 60 consists of a disk-like portion 61 and a coupling rod 62 extending therefrom and having a rectangular sectional profile. The free end of the coupling rod 62 is provided with a retainer 63. The stem of the coupling rod 62 is provided with a key 64 which extends in the widthwise direction to be received in the notch 14 of the coupling hole 12 of the band 10'. The coupling rod 62 has an anchor-shaped lock member provided on the opposite side of its stem portion.

The operation of this embodiment will now be described.

The plate member 43 of the fastening device 20' is turned inwardly about the hinge portion 42 so that its projection 44 strikes and is urged against the inner wall of the small diameter lower half 31. The projection 44 is then engaged in the engagement hole 46 as shown in FIG. 8 by inwardly pushing it and thereby causing elastic flexing of the small diameter lower half 31.

Then, the small diameter portion 31 of the fastening device 20' is forcibly inserted through a circular mounting hole S1' of a side wall S1 of an acoustic coupler S and is rotatably mounted in the hole S1' by virtue of the lock portions 33a and 33b.

Then, the band clip 60 is coupled to the band 10' by inserting its coupling rod 62 through the coupling hole 12 of the band 10' and inserting the key 64 in the notch 14, as shown in FIG. 10. In this state, the coupling rod 62 of the band clip 60 is inserted through a mounting hole S2' of the opposite side wall S2 of the acoustic coupler S, the orientation of the retainer 63 of the end of the coupling rod 62 is registered with the slot 45 of the plate member 43 by turning the device 20' mounted in the mounting hole S1' of the side wall S1, and in this state the coupling rod 62 is inserted. At this time, the lock piece 65 is fitted in the mounting hole S2'. Now, the band 10', band clip 60 and device 20' are coupled such that they can be rotated in unison with one another.

Then, the insertion section 10a of the band 10' is inserted through the band insertion hole 35b and then band insertion hole 35a of the fastening device 20' and is locked against return by the engagement of the lock pawl 39 of the lock piece 38 in a ratchet groove 13 of the band 10'.

As shown in FIG. 7, the handset H is set on the acoustic coupler S, and it is strongly fastened to the acoustic coupler S with the band 10' to ensure reliable transfer of acoustic signals. To remove the handset H, the engagement between the lock pawl 39 and ratchet groove 13 may be released by pushing the operating member 50 and the band 10' may be loosened. Alternatively the band 10' fastening device 20' and band clip 60 may be turned sidewise in unison with one another as shown by phantom lines in FIG. 7. Even when the insertion section 10b of the band 10' is removed from the body 30, the orientation of the band insertion hole 35b of the body 30 remains unchanged when the insertion section 10b is inserted again because the coupling rod 62 is coupled in the slot 45.

Figure 11:
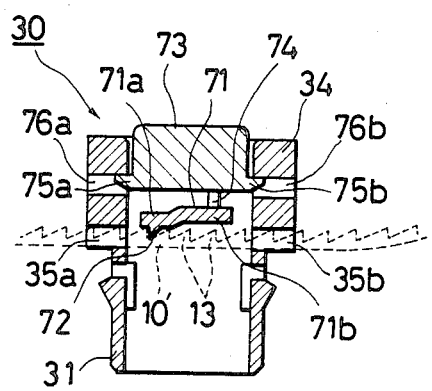
FIG. 11 is a sectional view showing a third embodiment of the device according to the invention.
Figure 12:
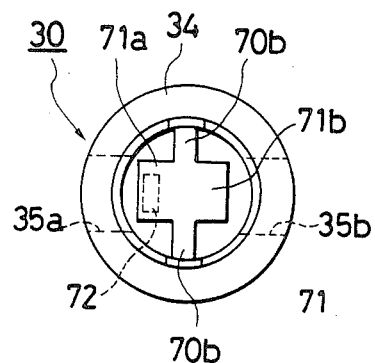
FIG. 12 is a plan view showing the body of the device shown in FIG. 11.

FIGS. 11 and 12 illustrate a third embodiment of the device for fastening according to the invention.

In this embodiment, a cross-shaped lock piece 71 is provided above the band insertion holes 35a and 35b of the body 30 of the device such that its coupling portions 70a and 70b are coupled to the inner wall of the large diameter upper half 34. One end 71a of the lock piece 71 is downwardly inclined and has a lock pawl 72 provided on the lower surface of the end. A cylindrical operating member 73 open at the lower end is accommodated in the large diameter upper half 34. The operating member 73 has a pin 74 in contact with the other end 71b of the lock piece 71, and stoppers 75a and 75b are accommodated in stopper holes 76a and 76b of the large diameter upper half 34.

In this embodiment, the band 10' is inserted with the ratched grooves 13 on the upper side through the band insertion holes 35b and then 35a. When the operating member 73 is pushed down, the other end 71b of the lock piece 71 is pushed down by the pin 74, so that the end 71a is displaced upwardly in a seesaw-like action. As a result, the lock pawl 72 is detached from the ratchet groove 13 of the band 10' so that the band 10' can be returned.

Figure 13:
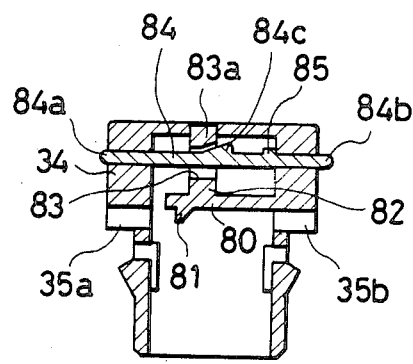
FIG. 13 is a sectional view showing a fourth embodiment of the device according to the invention.

FIG. 13 shows a fourth embodiment of the fastening device according to the invention.

In this embodiment, a lock piece 80 extends horizontally with its lower surface flush with the upper surface of the band insertion hole 35b. The end portion of the lock piece 80 has a lock pawl 81 provided on the lower surface. The lock piece 82 also has an upright portion 82 extending from the upper surface. The upright portion 82 has a horizontal hole 83 having an upper inclined surface 83a. An operating member 84 extends through the horizontal hole 83 of the upright portion 82, and its opposite ends 84a and 84b are inserted in holes formed in the large diameter upper half of the body. The operating member 84 has a length greater than the outer diameter of the large diameter upper half 34. Thus, either of its ends project outwardly. The operating member 84 has an inclined portion 84c formed on an intermediate portion. Reference numeral 85 designates a stopper.

In this embodiment, as in the third embodiment, the band is inserted with the ratchet grooves on the upper side through the band insertion hole 35b and then 35a and locked by the lock pawl 81 against return. When one end 84b of the operating member 84 is pushed in, the inclined portion 84c is brought into contact with the inclined section 83a of the upright portion 82 to raise the upright portion 82 of the lock piece 80. As a result, the lock pawl is detached from the ratchet groove so that the band becomes ready to be returned.

Figure 14:
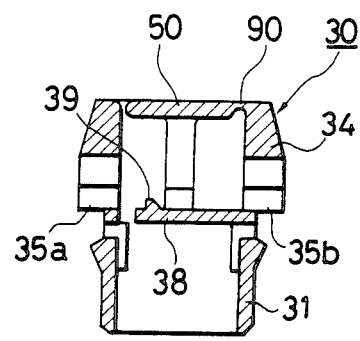
FIG. 14 is a sectional view showing a fifth embodiment of the device according to the invention.

While four embodiments of the invention have been described above, these are by no means limitative, and various changes and modifications are possible in the details of the construction. For example, while in the first embodiment the body 30 and band 10 are provided separately, it is possible for the body 30 to be integral with one end of the band 10. Further, as shown in FIG. 14, the operating member 50 may be made integral with the body 30 via a hinge portion 90. In this case, pushing down the operating member 50 turns it about the hinge portion 90 to release the engagement between the lock pawl 39 of the lock piece 38 and the ratchet groove of the band, while releasing it allows it to return to the upper set position by the elasticity of the hinge 90.

As has been described in the foregoing, with the fastening device according to the invention the lock of the band can be released by a single operation, that is, there is no need of the conventional complicated operation of inserting a finger nail sidewise and then raising the end of the lock piece. The operation of releasing the lock thus is extremely simplified.

What is claimed is:

1. A device for fastening a band-like member passed therethrough, comprising a body having an inner surface and an outer periphery, a band insertion hole for inserting a band-like member therethrough; a lock piece connected to and projecting from said body generally parallel to a band-like member inserted through said hole and having a lock pawl to be engaged in a groove of said band-like member inserted through said band insertion hole to prevent retraction; and an operating member interconnected with and slidably mounted on said body for movement transversely of said hole and engageable with said lock piece upon being manually moved relative to said body.

2. The device according to claim 1, wherein said lock piece has one end secured to the inner surface of said hollow cylindrical body, said lock pawl being provided at a free end of the lock piece.

3. The device according to claim 1, wherein said hollow cylindrical body has a top opening for receiving said operating member.

4. The device according to claim 3, wherein said operating member is inserted in said hollow cylindrical body through said top opening thereof and urges said lock piece with the lower end.

5. The device according to claim 1, wherein said body consists of a large diameter portion and a small diameter portion, said small diameter portion having a plurality of locking portions provided on the outer periphery.

6. A device for fastening a band-like member passed therethrough; comprising a hollow cylindrical body having an inner surface and an outer periphery; a top opening and a band insertion hole for inserting a band therethrough; a lock piece having one end secured to the inner surface of said hollow cylindrical body and having a lock pawl being provided at a free end; said lock pawl being engageable in a groove of said band-like member inserted through said band insertion hole to prevent retraction of said band-like member and an operating member interconnected with and slidably mounted on said body for releasing the engagement between said lock pawl and lock groove of said band-lock member by depressing said lock piece; said operating member being inserted into said hollow cylindrical body through said top opening and engaging said lock piece with a lower end thereof.

7. The device according to claim 6 wherein said body comprises a large diameter portion and a small diameter portion, said small diameter portion having a plurality of locking portions provided on the outer periphery.

* * * * *